(12) United States Patent
Lee et al.

(10) Patent No.: US 12,460,110 B2
(45) Date of Patent: Nov. 4, 2025

(54) ADHESIVE COMPOSITION, RUBBER REINFORCING MATERIAL AND ARTICLE

(71) Applicant: KOLON INDUSTRIES, INC., Seoul (KR)

(72) Inventors: Sung Gyu Lee, Seoul (KR); Ok Hwa Jeon, Seoul (KR); Min Ho Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 49 days.

(21) Appl. No.: 18/043,028

(22) PCT Filed: Nov. 22, 2021

(86) PCT No.: PCT/KR2021/017129
§ 371 (c)(1),
(2) Date: Feb. 25, 2023

(87) PCT Pub. No.: WO2022/124630
PCT Pub. Date: Jun. 16, 2022

(65) Prior Publication Data
US 2023/0357605 A1    Nov. 9, 2023

(30) Foreign Application Priority Data

Dec. 11, 2020  (KR) .......................... 10-2020-0173509
Nov. 17, 2021  (KR) .......................... 10-2021-0158503

(51) Int. Cl.
*C09J 11/06*    (2006.01)
*B60C 9/00*    (2006.01)
(Continued)

(52) U.S. Cl.
CPC ............. *C09J 11/06* (2013.01); *B60C 9/0042* (2013.01); *B60C 9/005* (2013.01); *C09J 11/04* (2013.01);
(Continued)

(58) Field of Classification Search
CPC . C09J 11/06; C09J 11/04; C09J 139/08; C09J 2301/408; B60C 9/0042; B60C 9/005; D02G 3/02; D02G 3/286; D02G 3/48; D06B 3/04; D06M 11/60; D06M 13/11; D06M 13/152; D06M 13/395;
(Continued)

(56) References Cited

U.S. PATENT DOCUMENTS 1,967,639 A     7/1934  Wedger
12,134,710 B2  11/2024  Kim

FOREIGN PATENT DOCUMENTS

CN    105073926 A    11/2015
CN    107964800 A     4/2018
(Continued)

OTHER PUBLICATIONS

International Search Report Dated Mar. 4, 2022.
The Office Action dated Jan. 23, 2025, of the corresponding Chinese Patent Application.

*Primary Examiner* — Ling Siu Cho
*Assistant Examiner* — Ronald Grinsted
(74) *Attorney, Agent, or Firm* — Harvest IP Law, LLP (57) ABSTRACT

The present application relates to an adhesive composition including a naturally occurring acid, a nitrogen compound, and a latex; and a rubber reinforcing material and an article including the same.

13 Claims, 4 Drawing Sheets

(51) Int. Cl.
| | |
|---|---|
| *C09J 11/04* | (2006.01) |
| *C09J 139/08* | (2006.01) |
| *D02G 3/02* | (2006.01) |
| *D02G 3/28* | (2006.01) |
| *D02G 3/48* | (2006.01) |
| *D06B 3/04* | (2006.01) |
| *D06M 11/60* | (2006.01) |
| *D06M 13/11* | (2006.01) |
| *D06M 13/152* | (2006.01) |
| *D06M 13/395* | (2006.01) |
| *D06M 15/356* | (2006.01) |
| *C08K 3/28* | (2006.01) |
| *C08K 5/13* | (2006.01) |
| *D06M 101/32* | (2006.01) |

(52) U.S. Cl.
CPC .............. *C09J 139/08* (2013.01); *D02G 3/02* (2013.01); *D02G 3/286* (2013.01); *D02G 3/48* (2013.01); *D06B 3/04* (2013.01); *D06M 11/60* (2013.01); *D06M 13/11* (2013.01); *D06M 13/152* (2013.01); *D06M 13/395* (2013.01); *D06M 15/3562* (2013.01); *C08K 3/28* (2013.01); *C08K 5/13* (2013.01); *C09J 2301/408* (2020.08); *D06M 2101/32* (2013.01); *D06M 2200/00* (2013.01); *D10B 2331/04* (2013.01); *D10B 2505/022* (2013.01)

(58) Field of Classification Search
CPC ......... D06M 15/3562; D06M 2101/32; D06M 2200/00; C08K 3/28; C08K 5/13; D10B 2331/04; D10B 2505/022
USPC .......................................................... 524/798
See application file for complete search history.

(56) References Cited

FOREIGN PATENT DOCUMENTS

| | | | |
|---|---|---|---|
| CN | 109196161 A | | 1/2019 |
| CN | 109403040 A | | 3/2019 |
| CN | 110520495 A | | 11/2019 |
| JP | H1053709 A | | 2/1998 |
| JP | 2008303378 A | | 12/2008 |
| KR | 19940024017 A | | 11/1994 |
| KR | 20010097726 A | * | 11/2001 |
| KR | 100824665 B1 | | 4/2008 |
| KR | 20150020417 A | | 2/2015 |
| KR | 20180110986 A | | 10/2018 |
| KR | 20190040127 A | * | 4/2019 |
| TW | 201546228 A | | 12/2015 |
| TW | 201823550 A | | 7/2018 |
| WO | 2018003572 A1 | | 4/2019 |

* cited by examiner

ADHESIVE COMPOSITION, RUBBER REINFORCING MATERIAL AND ARTICLE

CROSS-REFERENCE TO RELATED APPLICATION(S)

This application is a National Stage of International Application No. PCT/KR2021/017129 filed on Nov. 22, 2021 claiming the benefit of Korean Patent Application No. 10-2020-0173509 filed on Dec. 11, 2020 and Korean Patent Application No. 10-2021-0158503 filed on Nov. 17, 2021 in the Korean Intellectual Property Office, the disclosures of which are incorporated herein by reference in their entirety.

TECHNICAL FIELD

The present application relates to an adhesive composition, a rubber reinforcing material (e.g., cord) and an article (e.g., tire).

BACKGROUND ART

A fiber reinforcing material is used to reinforce the strength of the rubber structure. For example, polyester fiber, polyamide fiber, aromatic polyamide fiber, polyvinyl alcohol fiber and the like can be used as a reinforcing material for the rubber tire. Further, since the adhesiveness to the rubber may be poor depending on the fiber, the adhesiveness between the rubber and the fiber can be complemented after coating the adhesive onto the fiber surface. For example, in order to improve the adhesive force between the polyester fiber for tire cord (raw cord) and the rubber for tire, an adhesive is coated onto the polyester fiber.

In the prior art, it was common to use resorcinol-formaldehyde (RF) or a component derived therefrom as an adhesive for the above-mentioned applications. However, RF containing resorcinol which is phenols, and formaldehyde known as a carcinogen, is harmful to the human body, and additional costs for post-management and post-treatment may be incurred for an adhesive waste liquid containing RF.

On the other hand, as a method of coating the adhesive composition onto the fiber reinforcing material, dipping or spraying may be considered. In the cord manufacturing process to which the above method is applied, each component constituting the adhesive composition must be uniformly mixed and dispersed in the solvent contained in the composition. Further, it is important that an appropriate amount can be uniformly coated onto the surface of the fiber reinforcing material (e.g., raw cord) even after the composition in which each component is uniformly mixed and dispersed is dipped or sprayed. This is because the adhesive force cannot be secured if the components constituting the adhesive composition are not sufficiently mixed, or if the flowability of the composition becomes too high due to the use of an excessive solvent or the like.

Therefore, a technology that provides physical properties equal to or higher than those of products (e.g., adhesive, cord and/or tire) of the prior art while being less harmful to the human body and being environment-friendly, and that can provide improvements such as process convenience, is required.

DETAILED DESCRIPTION OF THE INVENTION

Technical Problem

It is one object of the present application to provide an adhesive that is less harmful to the human body and is eco-friendly.

It is another object of the present application to provide an adhesive capable of providing physical properties equal to or higher than those of the prior art adhesive in its use.

It is another object of the present application to provide an adhesive having excellent adhesive force.

It is another object of the present application to provide an adhesive that can provide process convenience in the adhesive coating process.

It is yet another object of the present application to provide a reinforcing material (e.g., cord) manufactured by using the adhesive and an article (e.g., tire) including the same.

The above and other objects of the present application can be completely achieved by the present application described below.

Technical Solution

According to the present disclosure, there is provided an adhesive composition comprising a naturally occurring acid (or natural acid), a nitrogen compound, and a latex, and satisfying a predetermined viscosity; a rubber reinforcing material comprising a coating layer of the adhesive composition and a fiber cord; and an article comprising the rubber reinforcing material.

As used herein, the term "room temperature" is a temperature in a state in which temperature decrease or temperature elevation is not particularly performed, and may mean, for example, a temperature in the range of 15 to 30° C. Specifically, within the above temperature range, the room temperature may be a temperature of 17° C. or more, 19° C. or more, 21° C. or more, or 23° C. or more, and may be a temperature of 29° C. or less or 27° C. or less. Further, unless otherwise specifically stated herein, the temperature at which the evaluation of the numerical properties is performed may be room temperature.

Unless otherwise defined herein, the term "solid content" may mean the content of the active ingredient (which may be in a solid form) remaining after evaporating moisture or liquid component (e.g., solvent) for a composition or each component contained in the composition. The conditions for evaporating moisture or liquid components (e.g., solvents) are not particularly limited, but for example, the warming (heating) conditions in the range of 70 to 100° C. for about 0.5 to 3 hours can be applied.

Hereinafter, the adhesive according to specific embodiments of the present application, the rubber reinforcing material and the article manufactured by using the adhesive, and the like will be described.

In one exemplary embodiment of the present application, the present application relates to an adhesive composition. The adhesive composition comprises a naturally occurring acid, a nitrogen compound and a latex.

In the prior art, the adhesive composition for tires generally contains a resorcinol-formaldehyde (RF) component. However, the present inventors have developed an adhesive composition containing a naturally occurring acid in order to solve the problems associated with harmful effect on the environment or human body due to the use of resorcinol-formaldehyde (RF). The adhesive composition of the present application containing a naturally occurring acid component has the advantage that it not only is harmless and eco-friendly compared to the prior art in which RF has been used, but also can provide properties equivalent to or higher than those of the prior art in its use and provide convenience in the process, as confirmed in the experimental examples described later.

As used herein, the term "naturally occurring acid" is a term used to distinguish it from an artificially synthesized acid component, which may mean an acid derived from a plant and/or a microorganism, or an acid comprising material derived from a plant and/or a microorganism. For example, the naturally occurring acid may be a component extracted from plant bark, oak galls, or leaves. More specifically, plants such as Mimosa wattle (*Acacia mollissima*), Quebracho (*Schnopsis* sp) and Radiata pine (*Pinus radiate*) contain significant amounts of tannins, and such plants can be used to extract naturally occurring acids. Such naturally occurring acids may be, for example, aromatic compounds having a hydroxyl group, that is, phenols or polyphenol-based compounds.

In one exemplary embodiment, the naturally occurring acid may be a naturally occurring tannic acid or may include the same. Tannic acid is an aromatic compound having a phenolic hydroxyl group, and is known as a material capable of having a gallol unit and/or a catechol unit. And, such tannic acid may be a mixture of various naturally occurring substances including plants.

Since the naturally occurring acid as described above has an aromatic structure having a hydroxyl group, it can provide suitable aggregation to the composition via a hydrogen bond and/or a hydrophobic bond. Further, it is possible to provide a color (color difference or Chrominance) unique to the cord, as described below.

Figure 6:
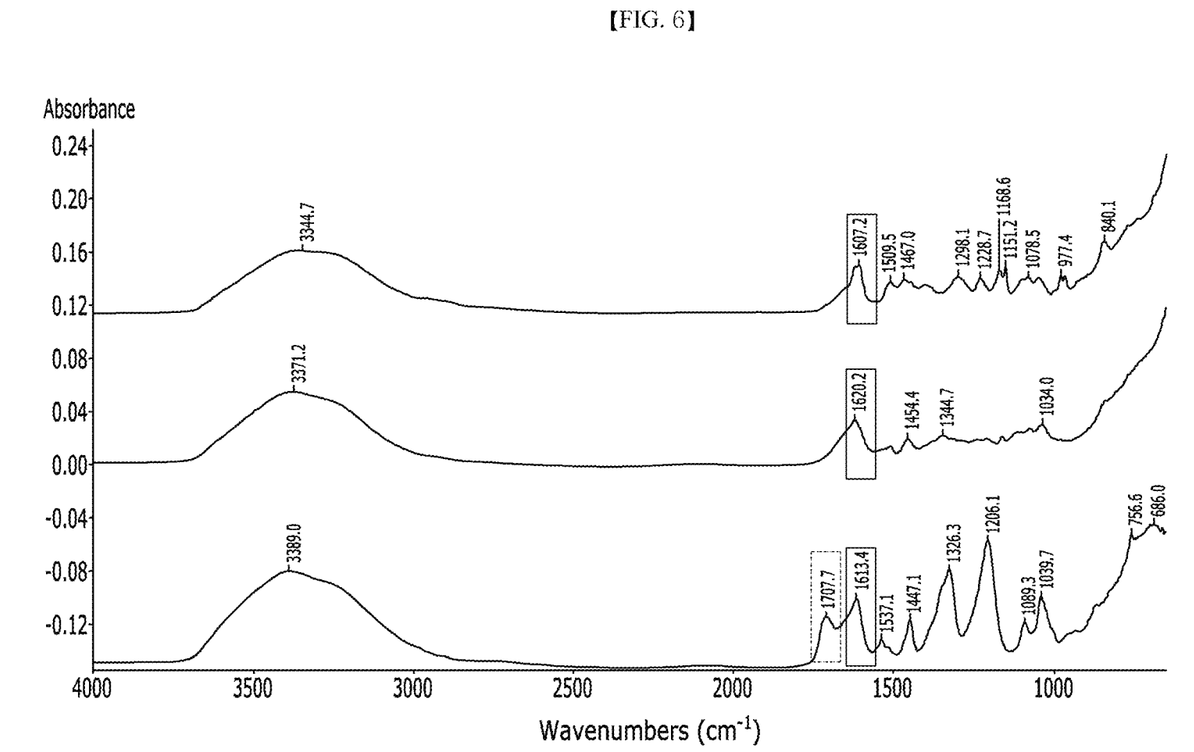
FIG. 6 is a graph showing the wavelength analysis results of the naturally occurring tannic acid used in Examples, the synthetic tannic acid used in Comparative Example 3, and the RF (dihydric phenol) of Comparative Example 4 according to infrared spectroscopy. In the figure, the graph shown at the top (or left) relates to RF, the graph shown at the bottom (or right) relates to a synthetic tannic acid, and the graph shown in the center relates to a naturally occurring tannic acid. A peak observed in the vicinity of a commonly identified wavenumber of about 1600 to 1620 cm$^{-1}$ is a peak for an aromatic ring. RF condensate and tannic acid commonly have a benzene ring, but RF is known as a hazardous substance. On the other hand, tannic acid is a non-hazardous substance except for direct inhalation of dust. On the other hand, in the case of a naturally occurring tannic acid and a synthetic tannic acid, it is confirmed that they are distinguished according to the presence or absence of a peak near a wavenumber of about 1700 cm$^{-1}$. The peak near the wavenumber of 1700 cm$^{-1}$ is a peak appearing in the C=O bond. This peak is considered to be due to the C=O bond generated in the process of artificially synthesizing tannic acid. That is, it can be seen that synthetic tannic acid and naturally occurring tannic acid are distinguished from each other in that the C=O-containing unit is smaller in naturally occurring tannic acid.

In one exemplary embodiment, the naturally occurring acid may have an infrared absorption peak characteristic as shown in FIG. 6, which will be described later. Specifically, the naturally occurring acid may exhibit an absorption peak at a wavenumber of 1650 $cm^{-1}$ or less when analyzed by infrared spectroscopy.

As shown in FIG. 6, unlike a naturally occurring tannic acid, a synthetic tannic acid shows an absorption peak at a wavenumber of about 1707 $cm^{-1}$, which is the peak corresponding to the C═O bond. This is considered to be because in the process of synthesizing tannic acid, units containing C═O are produced more than naturally occurring tannic acid. When many C═O bonds are contained, the affinity with water is high and therefore, an adhesive containing synthetic tannic acid may be thinner than an adhesive containing the same content of naturally occurring tannic acid. This may serve as an obstacle to securing the viscosity characteristic described later. Further, it is considered that the color difference confirmed through Examples and Comparative Example 3 described later also appears due to the structural difference confirmed by the infrared absorption peak analysis.

In an embodiment of the present application, the adhesive composition satisfies a range in which the relative viscosity (RV) measured at room temperature using an Ubbelohde viscometer is 2.30 or more and 3.00 or less.

The "relative viscosity" refers to the ratio of the viscosity (properties) of the composition to the reference solvent viscosity (characteristic), and the reference solvent used for measuring the relative viscosity may be water (e.g., demineralized water or pure water). Specifically, the relative viscosity (RV) can be calculated by measuring the time required for the composition to pass through a predetermined scale section of the Ubbelohde viscometer ($T_1$), and the time ($T_0$) required for water (e.g., demineralized water) to pass through a scale section of the same size, and then dividing $T_1$ by $T_0$. The relative viscosity calculated by $T_1$ and $T_0$ measured by the same viscometer under the same conditions can be treated as a dimensionless constant (or dimensionless value). More specifically, the description will be given in relation to the experiments that is described later with reference to FIG. 1.

Specifically, the lower limit of the relative viscosity may be, for example, 2.31 or more, 2.32 or more, 2.33 or more, 2.34 or more, 2.35 or more, 2.36 or more, 2.37 or more, 2.38 or more, 2.39 or more, 2.40 or more, 2.41 or more, 2.42 or more, 2.43 or more, 2.44 or more, 2.45 or more, 2.46 or more, 2.47 or more, 2.48 or more, 2.49 or more, 2.50 or more, 2.51 or more, 2.52 or more, 2.53 or more, 2.54 or more, 2.55 or more, 2.56 or more, 2.57 or more, 2.58 or more, 2.59 or more, 2.60 or more, 2.61 or more, 2.62 or more, 2.63 or more, 2.64 or more, 2.65 or more, 2.66 or more, 2.67 or more, 2.68 or more, 2.69 or more, 2.70 or more, 2.71 or more, 2.72 or more, 2.73 or more, 2.74 or more, 2.75 or more, 2.76 or more, 2.77 or more, 2.78 or more, 2.79 or more, 2.80 or more, 2.81 or more, 2.82 or more, 2.83 or more, 2.84 or more, 2.85 or more, 2.86 or more, 2.87 or more, 2.88 or more, 2.89 or more, or 2.90 or more. When the relative viscosity is less than the above range, there is a problem that the low molecular weight polymers formed during the preparation and curing of the composition are transferred to the adherend and an adhesive force is lowered and thereby, sufficient properties (e.g., mechanical strength, etc.) complying with the intended use may not be provided. Further, when the relative viscosity is lower than the above range, the flowability is relatively large and thus, it may not form a sufficient coating layer on the adherend.

And, the upper limit of the relative viscosity of the composition may be, for example, 2.99 or less, 2.98 or less, 2.97 or less, 2.96 or less, 2.95 or less, 2.94 or less, 2.93 or less, 2.92 or less, 2.91 or less, or 2.90 or less, and more specifically, may be 2.89 or less, 2.88 or less, 2.87 or less, 2.86 or less, 2.85 or less, 2.84 or less, 2.83 or less, 2.82 or less, 2.81 or less, 2.80 or less, 2.79 or less, 2.78 or less, 2.77 or less, 2.76 or less, 2.75 or less, 2.74 or less, 2.73 or less, 2.72 or less, or 2.71 or less. When the relative viscosity exceeds the above range, the cohesive force between the high molecular weight polymers formed in the process of producing and/or curing the composition becomes large, and it becomes difficult for the adhesive to be uniformly distributed (or coated) onto the adherend and thus, there is a problem that the adhesive force decreases. Therefore, sufficient properties (e.g., mechanical strength, etc.) complying with the intended use may not be provided.

As a result, as shown in Experimental Examples below, the adhesive composition satisfying the above-mentioned relative viscosity range provides excellent adhesive force and improves the processability and productivity in the manufacture and application of an adhesive.

The above-mentioned viscosity can be obtained, for example, by appropriately adjusting the components and content of the adhesive composition described later.

In one exemplary embodiment, the composition may include 1.0% by weight or more of the naturally occurring acid based on 100% by weight of the total content of the composition. The corresponding content may refer to the solid content occupied by the naturally occurring acid in the composition. Specifically, the lower limit of the content of the naturally occurring acid may be, for example, 1.5% by weight or more, 2.0% by weight or more, 2.5% by weight or more, 3.0% by weight or more, 3.5% by weight or more, 4.0% by weight or more, 4.5% by weight or more, 5.0% by weight or more, 5.5% by weight or more, or 6.0% by weight or more. And, the upper limit may be, for example, 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, or 5% by weight or less. When the above content is satisfied, it is advantageous for an adhesive to provide an appropriate level of viscosity and adhesion.

In one exemplary embodiment, the naturally occurring acid may be mixed with other composition components in a dispersed state in a solvent (water or organic solvent). In this case, the content and type of the solvent for dispersing the naturally occurring acid component can be determined within the range that can satisfy the viscosity of the entire composition described above.

The nitrogen compound is used for the purpose of adjusting the acidity of the composition containing tannic acid. Specifically, the nitrogen compound adjusts the acidity of the composition containing tannic acid to exhibit stable adhesion performance.

The specific type of the nitrogen compound can be selected from the levels that do not interfere with the function of the above-mentioned nitrogen compound. For example, the nitrogen compound may include at least one selected from the group consisting of ammonia ($NH_3$), aniline, trimethylamine, methylamine, dimethylamine, and ethylamine.

In one exemplary embodiment, the composition may include 0.5% by weight or more of the nitrogen compound based on 100% by weight of the total content of the composition. The corresponding content may mean the solid content occupied by the nitrogen compound in the composition. Specifically, the lower limit of the content of the nitrogen compound may be, for example, 1.0% by weight or more, 1.5% by weight or more, or 2.0% by weight or more. The upper limit may be, for example, 5.0% by weight or less, 4.5% by weight or less, 4.0% by weight or less, 3.5% by weight or less, or 3.0% by weight or less. When satisfying the above content, it is advantageous to secure stable adhesion performance by adjusting the titratable acidity.

In one exemplary embodiment, the nitrogen compound can be mixed with other composition components in a dispersed state in a solvent (water or organic solvent). In this case, the content and type of the solvent for dispersing the nitrogen compound component can be determined within the range that can satisfy the viscosity of the entire composition described above.

The latex component is a component used in consideration of the use of the composition. Specifically, the adhesive composition may be used for the purpose of reinforcing an adherend, such as a rubber composite or a rubber reinforcing material, and latex may be advantageous in ensuring affinity, miscibility, or adhesive force with an adherend. In some cases, the latex component contained in the adhesive composition can be selected to be the same as the rubber component forming the adherend.

The type of latex that can be used in the composition is not particularly limited, unless it is contrary to the present application, such as being able to satisfy the viscosity of the entire composition described above.

In one exemplary embodiment, the latex that can used includes natural rubber latex, vinyl-pyridine latex (hereinafter "VP latex") such as vinyl-pyridine-styrene-butadiene-based copolymer latex, styrene-butadiene-based copolymer latex, acrylic acid ester-based copolymer latex, butyl rubber latex, chloroprene rubber latex, or modified latex thereof. In relation to the modified latex, the method for modifying the latex and the specific type of latex are not limited. For example, a modified latex obtained by modifying a vinyl-pyridine-styrene-butadiene-based copolymer with a carboxyl group or the like can be used.

Commercially available latex can be used as long as it is not contrary to the present application, such as being able to satisfy the viscosity of the overall composition described below. For example, LM-60 from Denaka, VP-150 from APCOTEX, VB-1099 from Nippon A & L, 5218 from Closlen, 0653 from Closlen, and the like can be used as commercially available VP latex.

In one exemplary embodiment, a latex component containing at least one of the latexes described above can be used in the adhesive composition.

In one exemplary embodiment, the latex can be mixed with other composition components in a dispersed state in a solvent (water or organic solvent). In this case, the content and type of the solvent used in the latex component can be determined within a range that can satisfy the viscosity of the entire composition described above.

In one exemplary embodiment, the adhesive composition may include 5% by weight or more of the latex, based on the total content of the composition. In this case, the content may mean the content occupied by the latex solid content in the composition. Specifically, the lower limit of the content of the latex may be, for example, 6.0% by weight or more, 7.0% by weight or more, 8.0% by weight or more, 9.0% by weight or more, 10.0% by weight or more, 11.0% by weight or more, 12.0% by weight or more, 13.0% by weight or more, 14.0% by weight or more, 15.0% by weight or more, and the upper limit may be, for example, 30% by weight or less, 25% by weight or less, 20% by weight or less, or 15% by weight or less. When the above range is satisfied, it may be advantageous to ensure the affinity, miscibility, and/or adhesive force for the rubber-containing adherend in which the adhesive is used.

In one exemplary embodiment, the adhesive composition may include 5 to 50 parts by weight of the naturally occurring acid component based on 100 parts by weight of the latex. For example, the lower limit of the content of the naturally occurring acid may be, for example, 6 parts by weight or more, 7 parts by weight or more, 8 parts by weight or more, 9 parts by weight or more, 10 parts by weight or more, 11 parts by weight or more, 12 parts by weight or more, 13 parts by weight or more, 14 parts by weight or more, 15 parts by weight or more, 16 parts by weight or more, 17 parts by weight or more, 18 parts by weight or more, 19 parts by weight or more, 20 parts by weight or more, 21 parts by weight or more, 22 parts by weight or more, 23 parts by weight or more, 24 parts by weight or more, 25 parts by weight or more, 26 parts by weight or more, 27 parts by weight or more, 28 parts by weight or more, 29 parts by weight or more, 30 parts by weight or more, 31 parts by weight or more, 32 parts by weight or more, 33 parts by weight or more, 34 parts by weight or more, 35 parts by weight or more, 36 parts by weight or more, 37 parts by weight or more, 38 parts by weight or more, 39 parts by weight or more, or 40 parts by weight or more. And, the upper limit of the content of the naturally occurring acid may be, for example, 49 parts by weight or less, 48 parts by weight or less, 47 parts by weight or less, 46 parts by weight or less, 45 parts by weight or less, 44 parts by weight or less, 43 parts by weight or less, 42 parts by weight or less, 41 parts by weight or less, 40 parts by weight or less, 39 parts by weight or less, 38 parts by weight or less, 37 parts by weight or less, 36 parts by weight or less, 35 parts by weight or less, 34 parts by weight or less, 33 parts by weight or less, 32 parts by weight or less, 31 parts by weight or less, 30 parts by weight or less, 29 parts by weight or less, 28 parts by weight or less, 27 parts by weight or less, 26 parts by weight or less, 25 parts by weight or less, 24 parts by weight or less, 23 parts by weight or less, 22 parts by weight or less, 21 parts by weight or less, 20 parts by weight or less, 19 parts by weight or less, 18 parts by weight or less, 17 parts by weight or less, 16 parts by weight or less, 15 parts by weight or less, 14 parts by weight or less, 13 parts by weight or less, 12 parts by weight or less, 11 parts by weight or less, or 10 parts by weight or less. When the above range is satisfied, stable adhesive performance can be secured, and the viscosity suitable as an adhesive for tire cords can be obtained.

In one exemplary embodiment, the adhesive composition may include 0.5 to 25 parts by weight of the nitrogen compound based on 100 parts by weight of the latex. For example, the lower limit of the content of the nitrogen compound may be, for example, 1.0 parts by weight or more, 1.5 parts by weight or more, 2.0 parts by weight or more, 2.5 parts by weight or more, 3.0 parts by weight or more, 3.5 parts by weight or more, 4.0 parts by weight or more, 4.5 parts by weight or more, 5.0 parts by weight or more, 5.5 parts by weight or more, 6.0 parts by weight or more, 6.5 parts by weight or more, 7.0 parts by weight or more, 7.5 parts by weight or more, 8.0 parts by weight or more, 8.5 parts by weight or more, 9.0 parts by weight or more, 9.5 parts by weight or more, 10.0 parts by weight or more, 10.5 parts by weight or more, 11.0 parts by weight or more, 11.5 parts by weight or more, 12.0 parts by weight or more, 12.5 parts by weight or more, 13.0 parts by weight or more, 13.5 parts by weight or more, 14.0 parts by weight or more, 14.5 parts by weight or more, 15.0 parts by weight or more, 15.5 parts by weight or more, 16.0 parts by weight or more, 16.5 parts by weight or more, 17.0 parts by weight or more, 17.5 parts by weight or more, 18.0 parts by weight or more, 18.5 parts by weight or more, 19.0 parts by weight or more, 19.5 parts by weight or more, or 20 parts by weight or more. And, the upper limit of the content of the nitrogen compound may be, for example, 24.5 parts by weight or less, 24.0 parts by weight or less, 23.5 parts by weight or less, 23.0 parts by weight or less, 22.5 parts by weight or less, 22.0 parts by weight or less, 21.5 parts by weight or less, 21.0 parts by weight or less, 20.5 parts by weight or less, 20.0 parts by weight or less, 19.5 parts by weight or less, 19.0 parts by weight or less, 18.5 parts by weight or less, 18.0 parts by weight or less, 17.5 parts by weight or less, 17.0 parts by weight or less, 16.5 parts by weight or less, 16.0 parts by weight or less, 15.5 parts by weight or less, 15.0 parts by weight or less, 14.5 parts by weight or less, 14.0 parts by weight or less, 13.5 parts by weight or less, 13.0 parts by weight or less, 12.5 parts by weight or less, 12.0 parts by weight or less, 11.5 parts by weight or less, 11.0 parts by weight or less, 10.5 parts by weight or less, 10.0 parts by weight or less, 9.5 parts by weight or less, 9.0 parts by weight or less, 8.5 parts by weight or less, 8.0 parts by weight or less, 7.5 parts by weight or less, 7.0 parts by weight or less, 6.5 parts by weight or less, 6.0 parts by weight or less, 5.5 parts by weight or less, 5.0 parts by weight or less, 4.5 parts by weight or less, 4.0 parts by weight or less, 3.5 parts by weight or less, 3.0 parts by weight or less, 2.5 parts by weight or less, 2.0 parts by weight or less, 1.5 parts by weight or less, or 1.0 parts by weight or less. When the content range is satisfied, stable adhesion performance can be secured by adjusting the acidity.

In one exemplary embodiment, the adhesive composition may further include a solvent. The solvent component contained in the adhesive may mean a component excluding the above-mentioned other components whose content can be measured as a solid content. For example, the solvent component may be referred to as a non-solid content component.

The solvent may include, for example, at least one selected from known organic solvents and water. The known organic solvent is not particularly limited, and examples thereof include toluene and ethanol.

In one exemplary embodiment, the solvent component in the adhesive composition may contain water or may be water.

Further, in a specific embodiment of the present application, in consideration of harmfulness and flammability to the human body, the adhesive composition may include water without using an organic solvent (e.g., toluene or ethanol, etc.) as a solvent component. Alternatively, as a solvent of the adhesive composition, an excessive amount of water may be used together with a small amount of an organic solvent.

In one exemplary embodiment, based on the total weight of the adhesive composition, the content of the solvent in the adhesive composition may be 35% by weight or more, 40% by weight or more, 45% by weight or more, 50% by weight or more, 55% by weight or more, and 60% by weight, 65% by weight or more, 70% by weight or more, 75% by weight or more, 80% by weight or more, 85% by weight or more, or 90% by weight or more. And, the upper limit of the content of the solvent may be, for example, 95% by weight or less, 90% by weight or less, 85% by weight or less, 80% by weight or less, 75% by weight or less, 70% by weight or less, 65% by weight or less, 60% by weight or less, 55% by weight or less, or 50% by weight or less.

In one exemplary embodiment, the solvent included in the content range may be water or may include water.

In another exemplary embodiment, the excess or the majority of the solvent content may be occupied by water. For example, the excess of the solvent component content in the composition (e.g., about 35% by weight or more or 40% by weight or more based on the total weight of the adhesive composition) can be water, and the remaining content excluding water in the solvent (e.g., 30% by weight or less, 25% by weight or less, 20% by weight or less, 15% by weight or less, 10% by weight or less, or 5% by weight or less based on the total weight of the adhesive composition) may be occupied by an organic solvent or the like.

In one exemplary embodiment, the adhesive composition may be a water-based composition or an aqueous composition. Specifically, the solvent may include an excessive amount of water and a small amount of an organic solvent. Alternatively, the solvent may be water.

Although not particularly limited, water used as a solvent in the adhesive composition may be demineralized water (or pure water, demineralized water).

In one exemplary embodiment, based on the total weight of the composition for which the viscosity is measured, the content of water may be 35% by weight or more, 40% by weight or more, 45% by weight or more, 50% by weight or more, 55% by weight or more, 60% by weight or more, 65% by weight or more, 70% by weight or more, 75% by weight or more, 80% by weight or more, 85% by weight or more, or 90% by weight or more. And, the lower limit of the content of water may be, for example. 95% by weight or less, 90% by weight or less, 85% by weight or less, 80% by weight or less, 75% by weight or less, 70% by weight or less, 65% by weight or less, 60% by weight or less, 55% by weight or less, 50% by weight or less, or 45% by weight or less.

In one exemplary embodiment, the content of the solvent in the entire composition may mean the content of water that is mixed as a solvent.

In another exemplary embodiment, it can also mean that the content of the solvent in the entire composition includes not only the content of water mixed as a solvent, but also the content of a solvent (e.g., organic solvent and/or water) for dispersing the solid content component, for example, as in the case of mixing a latex dispersed in a solvent with other components to form a composition.

When the content related to the solvent is less than the above range, the dispersibility and miscibility of each component forming the composition deteriorates, the coating workability becomes poor, and the adhesive force of the adhesive layer formed on the adherend may be reduced. Further, when the content of the solvent exceeds the above range, it is not easy to form an adhesive layer on the adherend, so that the properties required for a rubber reinforcing material or a rubber composite are not sufficiently exhibited. And, when the content of the solvent exceeds the above range, as it takes a long time to dry, the processability is poor and the production cost increases.

In one exemplary embodiment, the adhesive composition may further include a small amount of a known adhesive (constituent) component known in the art related to tires or tire cords. At this time, the small amount may mean that it is included in the composition in an amount less than the component that is most frequently used among the latex component, the acid component and the nitrogen compound. Alternatively, the small amount may mean being included in the composition in an amount less than the component that is used least frequently among the latex component, the acid component and the nitrogen compound.

As a known adhesive component that can be used, for example, an isocyanate, an epoxy, a urethane, or various additives, and the like can be mentioned. Specific types of compounds such as isocyanate, epoxy, and urethane may be selected at a level that is not contrary to the achievement of the technical object of the present application, and the content can also be used in a small amount at a level that is not contrary to the achievement of the technical object of the present application.

In one exemplary embodiment, the adhesive composition may be formed by mixing a solvent with other components other than the solvent. Specifically, in a specific embodiment of the present application, the adhesive composition may be a mixture of a naturally occurring acid, a nitrogen compound, a latex, and a solvent. Alternatively, the adhesive composition may be a mixture of a naturally occurring acid, a nitrogen compound, a latex, a solvent, and a known adhesive component. For example, the composition contains a solvent (non-solid component) in an amount of 35% by weight or more, 40% by weight or more, 45% by weight or more, 50% by weight or more, 55% by weight or more, 60% by weight or more, 65% by weight or more, 70% by weight or more or 75% by weight or more, and 85% by weight or less or 80% by weight or less, and may contain as much solid content as the remaining residue amount. Further, the other components other than the solvent, that is, the solid content component, may be, for example, 40% by weight or less, 35% by weight or less, 30% by weight or less or 25% by weight or less, and 15% by weight or more or 20% by weight or more. Alternatively, the above content of the solid component and the remaining amount of the solvent (non-solid component) may form a composition.

In an embodiment related to the present application, the adhesive composition does not include resorcinol-formaldehyde (RF) or a component derived therefrom. That is, the composition of the present application may be an RF-free composition. Therefore, an adhesive composition that is not harmful to the human body and is eco-friendly as compared with the prior art using the RF component can be provided. In addition, the use of such adhesive compositions provides the advantage of reducing post-management and post-treatment costs.

In a specific embodiment of the present application, the adhesive composition may not include a coloring agent (color imparting agent or colorant).

Usually, the fiber for forming the cord has a white color, and the adhesive applied to the fiber is transparent. Further, when the transparent adhesive composition is coated onto the white tire cord fiber (or fiber substrate), it is required to confirm whether the adhesive composition is applied (or coated) sufficiently and uniformly to the extent that the desired properties of the tire cord can be ensured, but it is not easy to confirm the degree of coating of the transparent adhesive applied on the white fiber. In this regard, in the prior art, it was confirmed whether the adhesive was sufficiently applied by including a colorant in the adhesive component and confirming the color of the cord to which the adhesive was applied. However, since the colorant functions as a so-called nucleating agent depending on the conditions under which the adhesive is moved or stored, it increases the viscosity of the overall composition. The increase in the viscosity of the adhesive decreases the coating property of the adhesive, which causes a decrease in adhesion strength related to the cord and a deterioration in other properties associated with the adhesive strength.

On the other hand, according to the present application, as in the experiment to described later, since a naturally occurring acid component capable of imparting color difference values (L, a, and b values) in a predetermined range to the cord is used, it is possible to simply and conveniently confirm the degree of coating (e.g., whether a sufficient and uniform coating has been achieved) of the adhesive onto the tire cord fiber (or textile substrate). This saves time and money. In addition, the cord to which the adhesive is sufficiently and uniformly coated also has an advantage of providing excellent properties compared to the cord which is not so.

In another exemplary embodiment of the present application, the present application relates to a rubber reinforcing material. The rubber reinforcing material may be, for example, a tire cord coated with the adhesive described above on a base substrate. The base substrate may be a raw cord including a fiber component.

Specifically, the rubber reinforcing material (e.g., tire cord) may include: a raw cord including fibers; and a coating layer formed on the raw cord. The coating layer may be a coating layer formed from the above-mentioned adhesive composition or may include the same, and may be coated in a shape surrounding the surface of the raw cord.

The raw cord may be or include a textile fabric formed by twisting filament fibers. In a specific embodiment of the present application, the raw cord can be formed by twisting (e.g., primarily twisting and/or secondarily twisting) one or more fibers (e.g., multi-filaments). For example, the raw cord may be a two-ply or three-ply cord.

The fiber included in the raw cord is not particularly limited, and examples thereof may include at least one selected from the group consisting of a polyester fiber (e.g., PET fiber), a nylon fiber, an aramid fiber, a carbon fiber, a polyketone fiber, a cellulose fiber (e.g., lyocell fiber, rayon fiber) and a glass fiber.

In one exemplary embodiment, the raw cord may be a hybrid cord. For example, the raw cord may be a hybrid cord formed by secondarily twisting primarily twisted yarns having different types of fibers, such as including an aramid primarily twisted yarn and a nylon primarily twisted yarn.

In the case of a hybrid cord formed by secondarily twisting different types of primarily twisted yarns, due to differences in properties (e.g., modulus, etc.) between the primarily twisted yarns, the fatigue resistance is lowered, and therefore, the stability of the tire may be deteriorated. However, since the adhesive composition described above not only forms an appropriate coating layer on the hybrid raw cord as an adherend, but also imparts excellent adhesive force between the hybrid raw cord as an adherend and a tire component adjacent thereto, it is expected that the problem of deterioration of tire fatigue resistance due to the use of hybrid cords can be improved to some extent.

In one exemplary embodiment, the number of twists of the fiber strands used to form the raw cord may be 150 or more and 900 TPM (twist per meter) or less in the primarily twisting and/or secondarily twisting. For example, the number of twists may be 200 TPM or more, 250 TPM or more, 300 TPM or more, 350 TPM or more, 400 TPM or more, 450 TPM or more, 500 TPM or more, or 550 TPM or more. Further, the upper limit of the number of twists may be, for example, 850 TPM or less, 800 TPM or less, 750 TPM or less, 700 TPM or less, 650 TPM or less, 600 TPM or less, 550 TPM or less, 500 TPM or less, 450 TPM or less, or 400 TPM or less.

Although not particularly limited, the total fineness of the raw cord may be in the range of 400 to 9000 dtex. Specifically, considering the securing of mechanical properties, etc., the total fineness of the raw cord may be 1300 dtex or more, 1350 dtex or more, 1400 dtex or more, 1450 dtex or more, 1500 dtex or more, 1550 dtex or more, 1600 dtex or more, 1650 dtex or more, 1750 dtex or more, or 1800 dtex or more, and the upper limit may be, for example, 2000 dtex or less, 1950 dtex or less, 1900 dtex or less, 1850 dtex or less, 1800 dtex or less, 1750 dtex or less, 1700 dtex or less, 1650 dtex or less, or 1600 dtex or less.

In one exemplary embodiment, the coating layer may be a coating layer formed from the adhesive composition described above or may include the same. Specifically, the tire cord may be formed by coating the adhesive composition onto the raw cord. The method of coating the adhesive composition is not particularly limited. For example, the coating may be performed by a known dipping or spraying method.

According to a specific embodiment of the present application, the rubber reinforcing material (e.g., tire cord) in which the adhesive composition described above was coated onto the surface of the raw cord can satisfy the color difference value described later.

In one exemplary embodiment, the coating layer included in the tire cord may include a first coating layer; and a second coating layer formed on the first coating layer. Specifically, the tire cord may sequentially include a raw cord, a first coating layer, and a second coating layer (see FIG. 2).

Although not particularly limited, the first coating layer and the second coating layer may have visibly recognizable boundaries.

In one exemplary embodiment, the first coating layer may include the same component as the second coating layer.

In another exemplary embodiment, the first coating layer may include a component different from that of the second coating layer.

Specifically, when the first coating layer and the second coating layer include different components, the first coating layer can be formed by dipping the raw cord into the composition (first coating liquid) for forming a first coating layer including a reactive active group-imparting component. That is, the first coating layer is formed so as to surround the raw cord or its surface. The type of the reactive active group-imparting component used in the first coating layer is not particularly limited, and for example, the first coating liquid may include one or more compounds selected from epoxy and isocyanate. The solvent component included in the first coating layer forming composition (first coating liquid) is not particularly limited, but considering the miscibility with the second coating layer and the like, the same solvent (e.g., water) included in the second coating layer-forming composition may be included in the first coating layer-forming composition. Further, the second coating layer is formed by dipping a tire cord (or tire cord precursor) on which the first coating layer is formed on the surface into the second coating layer-forming composition (second coating liquid), and the second coating layer-forming composition (second coating liquid) may be the same as the adhesive composition satisfying the above-described viscosity.

In one exemplary embodiment, the first coating liquid may include an isocyanate compound and an epoxy compound. In this case, the epoxy compound and the isocyanate compound may be used in a weight ratio of 4:1 to 1:4, 3:1 to 1:3, or 2:1 to 1:2 to achieve sufficient crosslinking and an appropriate level of curing.

In another exemplary embodiment, the weight of the isocyanate compound in the entire composition may be greater than the weight of the epoxy compound, on the premise that the content range is satisfied.

A rubber reinforcing material (e.g., tire cord), in which a first coating layer for imparting a reactive active group to the surface of the raw cord and a second coating layer including the above-mentioned adhesive are sequentially formed, may satisfy a color difference value described later.

In one exemplary embodiment, the rubber reinforcing material (e.g., tire cord) has color difference values L, a, and b satisfying a predetermined range. Specifically, the tire cord satisfies the feature that an L value is in the range of 50 to 60, an a value is in the range of 4.5 to 10, and a b value is in the range of 10 to 25. The L value means the ratio of black to white, the a value means the ratio of red to green, and the b value means the ratio of yellow to blue. The color difference as described above is due to the color of the adhesive component. Since fibers used for tire cords usually have a white color sequence, the reinforcing material (e.g., tire cord) has the same color difference as described above, thereby capable of simply confirm with the naked eyes whether the adhesive composition is uniformly coated. The color difference of the tire cord can be measured, for example, by preparing two cord specimens in which a plurality of cord strands are arranged densely in one direction in a predetermined area, and then stacking up these specimens so that the direction in which one specimen cord strand is arranged and the direction in which the other specimen cord strand is arranged are 90°. At this time, the number of cords arranged in one direction in a predetermined length (e.g., 1 cm) is in the range of 10 to 25, for example, 13 or more or 15 or more, and 22 or less, 20 or less, or 18 or less. A spectrophotometer (CCM, X-rite color-eye 7000A) can be used for measuring the color difference.

In one exemplary embodiment, the cord may have an adhesive force of 10 kgf or more when the adhesive force is evaluated according to ASTM D4393. The adhesive force may be 15 kgf or more, 15.5 kgf or more, 16 kgf or more, 16.5 kgf or more, or 17 kgf or more. The specific method for measuring the adhesive force is as follows. First, a 0.6 mm thick rubber sheet, a cord sheet, 0.6 mm thick rubber sheet, a cord sheet, and 0.6 mm thick rubber sheet are sequentially laminated, and vulcanized at 170° C. under a pressure of 60 kg/cm$^2$ for 15 minutes to prepare a sample. The sample is cut to prepare a specimen having a width of 1 inch. Then, the prepared specimen is subjected to a peeling test at 25° C. at a speed of 125 mm/min using a universal testing machine (Instron) according to ASTM D4393, and the adhesive force of the cord is measured.

In another exemplary embodiment of the present application, the present application relates to a method of manufacturing a rubber reinforcing material. The manufacturing method of the rubber reinforcing material includes a step of coating a coating liquid onto a base substrate for a rubber reinforcing material to form a coating layer.

The method of coating the coating liquid onto the base substrate is not particularly limited, but may be, for example, spraying or dipping, preferably dipping.

In one exemplary embodiment, the rubber reinforcing material may be a tire cord.

In one exemplary embodiment, the base substrate may be a fiber substrate, specifically, raw cord. The description concerning the material for forming the raw cord and the like is the same as described above.

In one exemplary embodiment, the coating liquid may be the adhesive composition described above.

In one exemplary embodiment, the method comprises a step of coating a first coating liquid onto the base substrate for rubber reinforcing material to form a first coating layer on the base substrate; and a step of coating a second coating liquid onto the first coating layer to form a second coating layer on the first coating layer.

The method of coating the first coating liquid onto the base substrate or coating the second coating liquid onto the first coating layer is not particularly limited, and for example, it may be spraying or dipping, preferably dipping.

After coating the coating liquid for forming the first and/or second coating layer, drying and/or curing of the coating liquid may be performed, if necessary.

In one exemplary embodiment, the components of the first coating liquid and the second coating liquid may be the same or different.

For example, the first coating liquid may include an epoxy compound and an isocyanate compound in order to impart a reactive group to the fiber substrate or the like. At this time, the epoxy compound and the isocyanate compound may be used in a weight ratio of 4:1 to 1:4, 3:1 to 1:3, or 2:1 to 1:2 so that sufficient crosslinking and appropriate level of curing can be performed.

In one exemplary embodiment, the first coating liquid may include a solvent. That is, the first coating liquid may include an epoxy compound, an isocyanate compound, and a solvent.

When the content of the solvent is insufficient, the primary coating by dipping is not performed smoothly, and when the content of the solvent is too large, the reactive group is not sufficiently imparted to the base substrate for reinforcing rubber. Considering these points, the solvent has a content of 94 to 99% by weight based on the total weight of the first coating liquid, and the mixture of the epoxy compound and the isocyanate compound has a content of 1 to 6% by weight. That is, the first coating liquid includes 1 to 6% by weight of a mixture consisting of an epoxy compound and an isocyanate compound and 94 to 99% by weight of a solvent based on the total weight. Although not particularly limited, the solvent that can be included or used in the first coating liquid may include the same components as the solvent of the second coating liquid.

In one exemplary embodiment, the base substrate for rubber reinforcing material can be dipped in the first coating liquid and then dried. Specifically, the first coating liquid is coated onto the base substrate for rubber reinforcing material by dipping. Then, the first coating liquid can be dried and cured to form a first coating layer.

In a specific embodiment according to the present application, drying of the first coating liquid coated onto the base substrate may be performed at a temperature of 100 to 160° C. for 30 to 150 seconds. Further, in a specific embodiment of the present application, after drying, it is possible to perform a step of curing the dried first coating liquid at a temperature of 200 to 260° C. for 30 to 150 seconds. A first coating layer is formed on the base substrate for rubber reinforcing material according to the drying and curing. Through drying and curing under the above conditions, the first coating layer may be stably formed on the base substrate for rubber reinforcing material.

Although not particularly limited, a tension in the range of 0.05 to 3.00 g/d can be applied to the raw cord during the dipping, drying, and/or curing process. However, another embodiment of the present application is not limited thereto, and tension may not be applied to the raw cord.

In one exemplary embodiment, the second coating liquid different from the first coating liquid including the epoxy compound and the isocyanate compound may be an adhesive composition satisfying the above-described viscosity. Specifically, the second coating liquid may include at least a naturally occurring acid, a nitrogen compound, and a latex.

In a specific embodiment according to the present application, the method may further include a step of forming a second coating layer on a base substrate for a rubber reinforcing material to which a reactive active group is imparted, that is, on the first coating layer. A process (e.g., method and conditions) of forming the second coating layer may be the same as or similar to that of forming the first coating layer.

For example, a second coating liquid can be coated onto the base substrate and the first coating layer to form a second coating layer. Alternatively, the second coating liquid can be coated onto the base substrate and the first coating layer, and then the second coating liquid can be dried and cured. The second coating liquid can be applied by dipping, spraying or the like.

In a specific embodiment of the present application, drying of the second coating liquid can be performed at a temperature of 100 to 160° C. for 30 to 150 seconds. Further, in a specific embodiment of the present application, after the drying, the second coating liquid can be cured at a temperature of 200 to 260° C. for 30 to 150 seconds. By drying and curing under the above conditions, the second coating layer may be stably formed on the first coating layer. As a result, a rubber reinforcing material having a coating layer is provided.

Although not particularly limited, a tension in the range of 0.05 to 3.00 g/d may be applied to the raw cord during the dipping, drying, and/or curing process. However, another embodiment of the present application is not limited thereto, and tension may not be applied to the raw cord.

Figure 2:
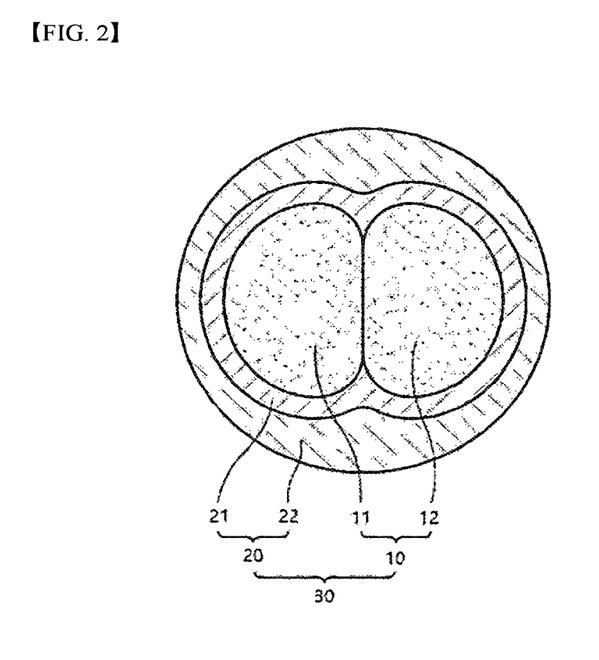
FIG. 2 schematically shows a cross section of a tire cord that can be manufactured by using an adhesive composition according to an exemplary embodiment of the present application.
Figure 3:
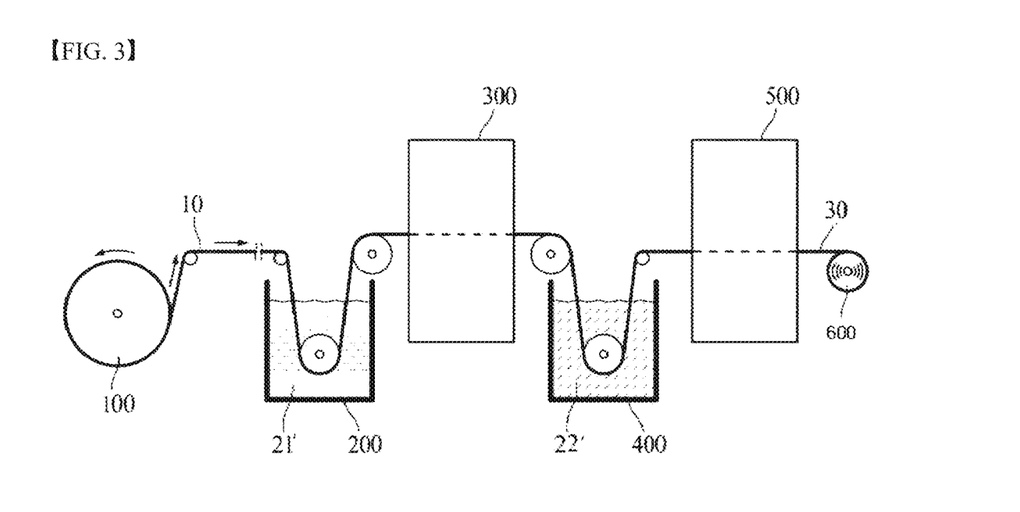
FIG. 3 schematically shows a manufacturing process of a tire cord.

A method of manufacturing a rubber reinforcing material according to an exemplary embodiment of the present application will be described below with reference to FIGS. 2 and 3.

A raw cord 10 may be manufactured and/or distributed in a state of being wound around a first winder 100. Then, the raw cord 10 can be dipped in a first coating liquid 21' contained in a first coating tank 200 and coated onto the raw cord 10. During the dipping step, the tension, dipping time and temperature can be appropriately adjusted, which may be appropriately adjusted by those skilled in the art.

Next, the first coating liquid 21' applied to the raw cord 10 may be dried and cured. Drying may be performed in a drying device 300. Conditions such as temperature and time for drying and curing are as described above.

Next, a step of forming the second coating layer 22 on the first coating layer 21 is performed. The second coating layer forming step is a step of applying the rubber-based adhesive composition to the raw cord 10 to which the active group is imparted by the first coating layer 21. For the formation of the second coating layer, a second coating liquid having a composition different from that of the first coating liquid can be used, and the dipping step can be applied in the same manner as in the formation of the first coating layer.

For the formation of the second coating layer 22, the raw cord 10 coated with the first coating layer 21 is dipped in a second coating liquid 22'. The second coating liquid 22 ' is contained in the second coating tank 400. The second coating liquid 22' is applied on the first coating layer 21 by the dipping. During the dipping step, the tension, dipping time and temperature can be appropriately adjusted, which can be appropriately adjusted by those skilled in the art.

Then, drying and curing of the second coating liquid 22' is performed. The drying and curing can be performed in the drying device 500. The conditions such as temperature and time for drying and curing are as described above.

Through the fixing as described above, the second coating layer 22 is formed on the first coating layer 21. The tire cord 30 manufactured in this way is wound around a second winder 600.

The tire cord 30 having the coating layer formed by dipping as described above may be referred to as a dipped cord.

In another exemplary embodiment of the present application, the present application relates to an article (or rubber composite) including the rubber reinforcing material. The rubber composite may be, for example, a tire. The tire includes the above-mentioned tire cord.

Figure 4:
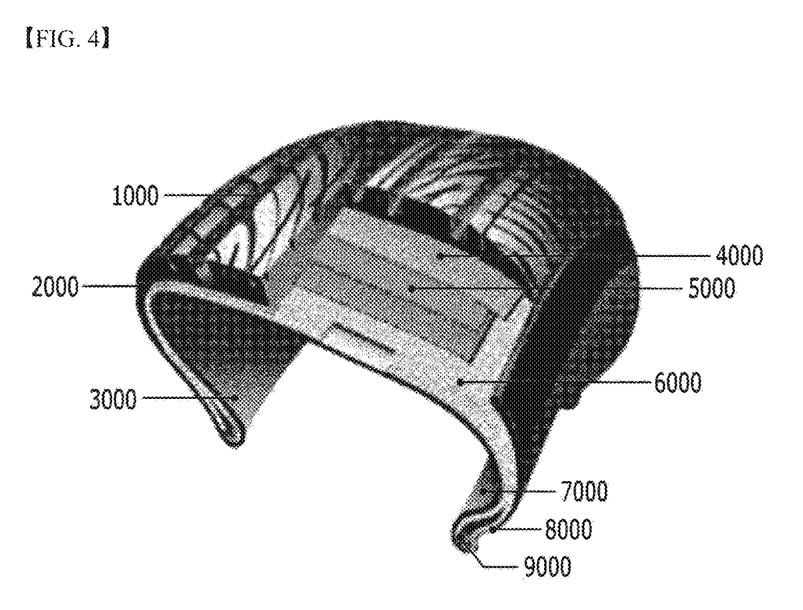
FIG. 4 schematically shows a cross section of a tire that can be manufactured by using an adhesive composition according to an exemplary embodiment of the present application.

The tire may have a commonly known configuration (e.g., the tire is tread, body ply, belt, sidewall, bead, inner liner, cap ply, or apex, etc.) in addition to the tire cord (see FIG. 4).

Advantageous Effects

According to an exemplary embodiment of the present application, an adhesive that not only is less harmful to the human body and is eco-friendly, but also provides convenience in the cord manufacturing process and reduces costs, can be provided. Also, the present application has the effect of providing an adhesive that provides properties (e.g., adhesive force) equal to or higher than those of the prior art. In addition, according to another exemplary embodiment of the present application, a rubber reinforcing material (e.g., tire cord) and an article (e.g., tire) manufactured by using the adhesive can be provided.

BRIEF DESCRIPTION OF THE DRAWING

FIG. 5 schematically shows the appearance of a sample for color difference measurement. Specifically.

DESCRIPTION OF SYMBOLS

10: raw cord
11: primarily twisted yarn
12: primarily twisted yarn
20: coating layer
21: first coating layer
21': first coating liquid
22: second coating layer
22': second coating liquid
30: tire cord
100: first winder
200: first coating tank
300: first drying device
400: second coating tank
500: second drying device
600: second winder
1000: tread
2000: shoulder
3000: sidewall

4000: cap ply
5000: belt
6000: body fly or carcass
7000: inner liner
8000: apex
9000: bead

DETAILED DESCRIPTION OF THE EMBODIMENTS

Hereinafter, the action and effect of the invention will be described in more detail with reference to specific examples of the invention. However, these examples are presented for illustrative purposes only and the scope of the invention is not limited thereby in any way.

Preparation of Compositions of Examples and Comparative Examples

The compositions of Examples and Comparative Examples were prepared by performing the mixing and stirring under the same conditions except that that the content (wt. %) ratio was the same as in Table 1 below. Specifically, each component was mixed and stirred at about 20° C. for 24 hours.

TABLE 1

| | Solvent[1] | Nitrogen compound ($NH_3$) | Acid component[2] | Latex[3] | Sum of component content | Solid content (TSC) |
|---|---|---|---|---|---|---|
| Example 1 | 76.30 | 0.80 | 3.40 | 19.50 | 100 | 23.70 |
| Example 2 | 80.00 | 0.70 | 2.90 | 16.40 | 100 | 20.00 |
| Example 3 | 77.50 | 0.80 | 3.20 | 18.50 | 100 | 22.50 |
| Example 4 | 75.00 | 0.90 | 3.60 | 20.50 | 100 | 25.00 |
| Example 5 | 76.30 | 1.00 | 3.40 | 19.30 | 100 | 23.70 |
| Example 6 | 76.30 | 1.20 | 3.40 | 19.10 | 100 | 23.70 |
| Example 7 | 76.30 | 1.00 | 4.20 | 18.50 | 100 | 23.70 |
| Example 8 | 76.30 | 1.10 | 4.60 | 18.00 | 100 | 23.70 |
| Example 9 | 76.30 | 1.20 | 5.00 | 17.50 | 100 | 23.70 |
| Example 10 | 76.30 | 1.30 | 5.40 | 17.00 | 100 | 23.70 |
| Comparative Example 1 | 77.04 | 0.06 | 3.40 | 19.50 | 100 | 22.96 |
| Comparative Example 2 | 78.90 | 0.80 | 0.80 | 19.50 | 100 | 21.10 |
| Comparative Example 3 | 78.30 | 0.80 | 3.40[4] | 17.50 | 100 | 21.70 |
| Reference Example 1 | 76.30 | 1.30 | 5.40[5] | 17.00 | 100 | 23.70 |

Unit: wt. %
[1]Solvent (non-solid component): The amount of water (pure water) charged in Examples and Comparative Examples was about 40 to 50 wt. %, and the other solvents were solvents used to disperse acids, nitrogen compounds, and latex.
[2]Acid component: Naturally occurring tannic acid was used unless otherwise specified.
[3]Latex: VP latex was used.
[4]In Comparative Example 3, synthetic tannic acid manufactured by Sigma-Aldrich was used.
[5]In Reference Example 1, HiRENOL KOSABOND-R50 produced by Colon Industries was used as RF (dihydric phenol) which is an acid component.

Experiment 1: Measurement of Relative Viscosity of Compositions of Examples and Comparative Examples The viscosity of the adhesive composition having the components shown in Table 1 was measured after being left for 30 minutes in a constant temperature water bath (about 25° C.) using an Ubbelohde viscometer. Specifically, a certain amount of demineralized water was put into the Ubbelohde viscometer through the following process, the viscosity characteristics of demineralized water were measured. After measuring the viscosity characteristics of the composition in the same way, the relative viscosity was calculated based on the previously measured viscosity characteristics of demineralized water. The results are shown in Table 2.

Figure 1:
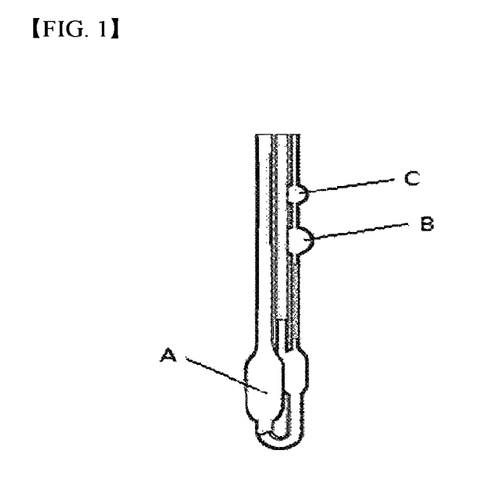
FIG. 1 schematically shows an Ubbelohde viscometer in order to explain a method for measuring the relative viscosity of the adhesive composition of the present application.

The viscosity measurement process will be described below with reference to FIG. 1.

(1) The sample (composition or demineralized water) was injected into tube A of the Ubbelohde viscometer.
(2) The constant temperature water bath was set to 25° C., then part C was fixed so as to be submerged in a water bath, and left for 30 minutes.
(3) Using a pipette filler, the sample was set so as to reach the center of part C.
(4) After that, the sample was flown downward, and the time required for the liquid level of the sample to pass through the upper scale of B and pass the lower scale of B was measured.
(5) The measured time was applied to the following relative viscosity calculation formula to obtain the relative viscosity.

<Relative Viscosity Calculation Formula>

$$\text{Relative viscosity} = T_1/T_0$$

In the above formula, $T_1$ is the time required for the adhesive composition to pass through the upper scale of B and pass through the lower scale of B, and $T_0$ is the time required for the demineralized water to pass through the upper scale of B and pass through the lower scale of B.

TABLE 2

| | Relative viscosity |
|---|---|
| Example 1 | 2.51 |
| Example 2 | 2.46 |
| Example 3 | 2.55 |
| Example 4 | 2.58 |
| Example 5 | 2.54 |
| Example 6 | 2.59 |
| Example 7 | 2.62 |
| Example 8 | 2.68 |
| Example 9 | 2.75 |
| Example 10 | 2.79 |
| Comparative Example 1 | 2.21 |
| Comparative Example 2 | 2.04 |
| Comparative Example 3 | 2.13 |
| Reference Example 1 | 2.36 |

From Tables 1 and 2, it is confirmed that the viscosity of the adhesive composition varies depending on the components forming the composition and their contents. The component, content, and viscosity of the adhesive affect color characteristics and adhesive force, as in the experiments described below.

Experiment 2: Measurement of Color Difference of Dipped Cord

2 Strands of primarily twisted yarns (Z-direction) having a twist number of 360 TPM using a polyester yarn were prepared, and then the 2 strands of primarily twisted yarns were secondarily twisted (S-direction) together with a twist number of 360 TPM to prepare a plied twisted yarn (1650 dtex/2 ply). The plied twisted yarn thus prepared was used as a raw cord 10.

The polyester raw cord was dipped in the first coating liquid, and then treated for about 1 minute at a drying temperature of 150° C. and a curing temperature of 240° C., respectively, to form a first coating layer 21 and thereby, a reactive active group was imparted to the cord. At this time, the first coating liquid was prepared by mixing an epoxy compound and an isocyanate compound, which are some of the components used in Preparation Example 2, in a weight ratio of about 1:2, together with 97% by weight of demineralized water.

Then, the raw cord on which the first coating layer was formed was dipped in the second coating liquid (adhesive compositions prepared in Examples and Comparative Examples), dried and cured to form the second coating layer 22. At this time, drying and curing were performed for about 1 minute at a drying temperature of 150° C. and a curing temperature of 235° C., respectively. The dipping step of the first coating liquid and the dipping step of the second coating liquid were performed continuously, and the tension condition at this time was 0.5 g/d. A tire cord 30 was manufactured in the form of a dipped cord through the above process.

Figure 5A:
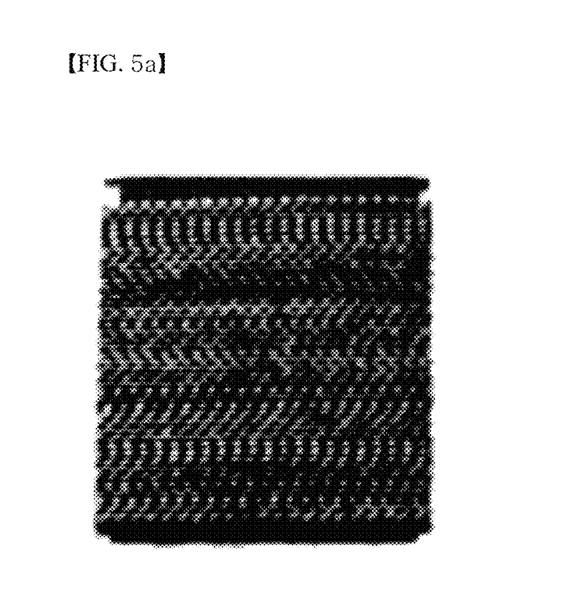
FIG. 5a is an exemplary embodiment of one specimen (S1 or S2), and FIG. 5b schematically shows a state in which two specimens S1 and S2 intersect.
Figure 5B:
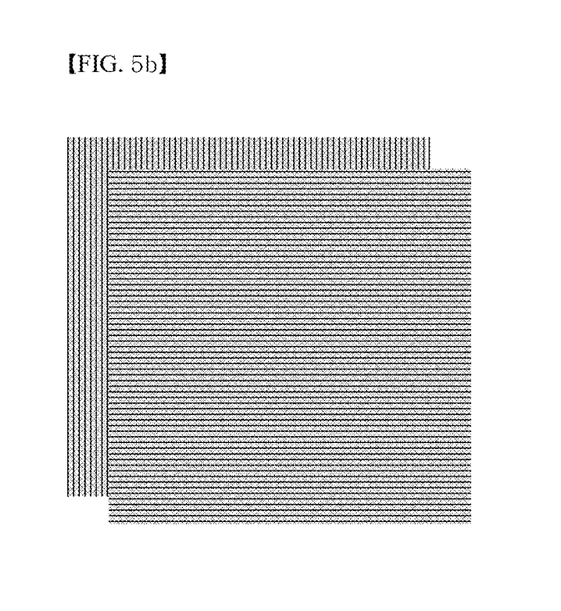

The manufactured tire cord was cut to prepare two square specimens (S1, S2) having a size of 5 cm×5 cm. Specifically, two specimens (S1, S2) in which a plurality of cord strands were closely arranged in one direction were prepared so that 15 to 16 strands per 1 cm were present, and then these specimens were stacked up so that the direction in which the cords of the specimen S1 were arranged and the direction in which the cords of the specimen S2 were arranged were 90°, which were used as the samples for measuring the color difference (see FIGS. 5a and 5b).

The color difference (L, a, b) of each sample was measured 10 times using a spectrophotometer (CCM, X-rite color-eye 7000A), and the arithmetic mean value was obtained. The results are shown in Table 3 below.

TABLE 3

|  | L | a | b |
|---|---|---|---|
| Example 1 | 54.96 | 5.04 | 17.59 |
| Example 2 | 53.19 | 4.99 | 17.53 |
| Example 3 | 54.01 | 7.20 | 21.41 |
| Example 4 | 55.78 | 7.19 | 21.33 |
| Example 5 | 54.61 | 6.97 | 21.20 |
| Example 6 | 54.72 | 7.00 | 21.00 |
| Example 7 | 55.67 | 7.04 | 21.00 |
| Example 8 | 55.34 | 6.91 | 22.55 |
| Example 9 | 56.39 | 7.21 | 22.75 |
| Example 10 | 57.34 | 7.44 | 23.04 |
| Comparative Example 1 | 44.17 | 5.64 | 12.65 |
| Comparative Example 2 | 40.23 | 5.92 | 11.52 |
| Comparative Example 3 | 46.52 | 5.66 | 9.71 |
| Reference Example 1 | 52.63 | 12.56 | 15.38 |

It is confirmed that Examples containing an appropriate amount of naturally occurring tannic acid along with other components show the above-mentioned L*, a*, and b* values. That is, the tire cord according to Examples had a dark auburn color. On the other hand, it is confirmed that Comparative Examples 1 to 3 do not generally satisfy the L* value among the color difference values.

Specifically, when confirmed with the naked eye, Reference Example 1 showed a light auburn color, and Examples showed a darker auburn-based color. This is judged to be because the L* value and the a* value of Reference Example 1 are generally low, and the a* value is generally high, as compared with Examples.

In addition, in the case of Comparative Examples in which the L and b values were generally lower than in Examples, it showed generally purple.

Experiment 3: Evaluation of Adhesive Force

The adhesive force per unit area to the tire cords manufactured in Experiment 2 was evaluated. The adhesive force evaluation was performed by measuring the adhesive peel strength of the tire cord using the method of ASTM D4393.

Specifically, 0.6 mm thick rubber sheet, cord sheet (corresponding to $S_1$, which is one of the specimens manufactured in Experiment 2), 0.6 mm thick rubber sheet, and cord sheet (corresponding to S1, which is one of the specimens manufactured in Experiment 2), 0.6 mm thick rubber sheet were sequentially laminated, and vulcanized at 170° C. under a pressure of 60 kg/cm$^{-1}$ for 15 minutes to prepare a sample. Then, the sample was cut to prepare a specimen having a width of 1 inch. For reference, the rubber sheet has the composition shown in Table 4 below, and is a sheet used for carcass constituting the tire. By using a laminate utilizing such a rubber sheet, the adhesive force of the tire cord to the carcass layer can be confirmed.

For the prepared specimen, a peeling test was performed at 25° C. at a speed of 125 mm/min using a universal material tester (Instron) to measure the adhesive force of the tire cord to the carcass layer, and the relative magnitudes of the measured adhesive forces are shown in Table 5 below. At this time, the average value of three times the load generated during peeling was calculated as the adhesive force.

TABLE 4

| Rubber sheet component | Content (weight ratio based on 100 parts by weight of natural rubber) |
|---|---|
| Natural rubber | 100 |
| Zinc oxide | 3 |
| Carbon black | 29.8 |
| Stearic acid | 2.0 |
| Pine tar | 7.0 |
| Mercaptobenzothiazole | 1.25 |
| Sulfur | 3.0 |
| Diphenylguanidine | 0.15 |
| Phenylbetataphthalamine | 1.0 |

TABLE 5

|  | Adhesive composition used in the manufacture of cords | Adhesive force (kgf) |
|---|---|---|
| Example 11 | Example 1 | 17.4 |
| Example 12 | Example 2 | 15.6 |
| Example 13 | Example 3 | 16.4 |
| Example 14 | Example 4 | 16.3 |
| Example 15 | Example 5 | 16.7 |
| Example 16 | Example 6 | 16.7 |
| Example 17 | Example 7 | 17.1 |
| Example 18 | Example 8 | 17.8 |
| Example 19 | Example 9 | 17.7 |
| Example 20 | Example 10 | 17.8 |
| Comparative Example 4 | Comparative Example 1 | 8.1 |
| Comparative Example 5 | Comparative Example 2 | 6.9 |
| Comparative Example 6 | Comparative Example 3 | 11.5 |
| Reference Example 2 | Reference Example 1 | 15.6 |

From Table 5, it is confirmed that Examples provide stronger adhesive force than that of Comparative Examples.

In addition, comparing Reference Example 2 with Examples, it can be seen that the present invention not only provides an adhesive force equal to or higher than that of the prior art, but also has less harmful to the human body and is eco-friendly.

The invention claimed is:

1. An adhesive composition comprising a naturally occurring acid, a nitrogen compound, and a latex,
wherein a relative viscosity measured at room temperature using an Ubbelohde viscometer satisfies the range of 2.30 to 3.00,
wherein the naturally occurring acid comprises a naturally occurring tannic acid, which contains 5 to 50 parts by weight based on 100 parts by weight of the latex,
wherein the nitrogen compound includes at least one selected from the group consisting of ammonia (NH), aniline, trimethylamine, methylamine, dimethylamine, and ethylamine, which contains 0.5 to 25 parts by weight based on 100 parts by weight of the latex.

2. The adhesive composition according to claim 1, which contains 1.0% by weight or more of the naturally occurring acid based on 100% by weight of the total content of the composition.

3. The adhesive composition according to claim 1, which contains 0.5% by weight or more of the nitrogen compound based on 100% by weight of the total content of the composition.

4. The adhesive composition according to claim 1, which further comprises a solvent.

5. The adhesive composition according to claim 4, which contains 35% by weight or more of the solvent based on 100% by weight of the total content of the composition.

6. The adhesive composition according to claim 4, which contains 50% by weight or more of the solvent based on 100% by weight of the total content of the composition.

7. The adhesive composition according to claim 4, wherein:
the solvent comprises water.

8. A rubber reinforcing material comprising a raw cord containing a fiber; and a coating layer formed on the raw cord,
wherein the coating layer comprises the adhesive composition according to claim 1.

9. The rubber reinforcing material according to claim 8, wherein:
the raw cord comprises at least one selected from the group consisting of a polyester fiber, a nylon fiber, an aramid fiber, a carbon fiber, a polyketone fiber, a cellulose fiber, and a glass fiber.

10. The rubber reinforcing material according to claim 8, wherein:
when measured by a color-difference meter, the $L^*$ value is 50 to 60, the $a^*$ value is 4.5 to 10, and the $b^*$ value is 10 to 25.

11. The rubber reinforcing material according to claim 8, wherein:
the rubber reinforcing material is a tire cord.

12. An article comprising the rubber reinforcing material according to claim 8.

13. The article according to claim 12, wherein: the article is a tire.

* * * * *